United States Patent
Weidinger et al.

(10) Patent No.: US 7,147,093 B2
(45) Date of Patent: Dec. 12, 2006

(54) CENTRIFUGAL CLUTCH

(75) Inventors: Reinhold Weidinger, Kolitzheim (DE); Winfried Stürmer, Euerbach (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/861,037

(22) Filed: Jun. 4, 2004

(65) Prior Publication Data
US 2004/0262115 A1 Dec. 30, 2004

(30) Foreign Application Priority Data
Jun. 30, 2003 (DE) ................................ 103 29 308

(51) Int. Cl.
*F16D 43/04* (2006.01)
(52) U.S. Cl. ............................... 192/70.25; 192/105 B; 192/111 A
(58) Field of Classification Search ............ 192/105 B, 192/70.25, 103 A, 111 A
See application file for complete search history.

(56) References Cited

U.S. PATENT DOCUMENTS

| | | | | |
|---|---|---|---|---|
| 2,094,247 A | * | 9/1937 | Vail | 192/105 B |
| 5,070,984 A | * | 12/1991 | Fehring | 192/105 B |
| 5,638,935 A | * | 6/1997 | Fehring | 192/105 B |
| 5,806,646 A | * | 9/1998 | Grosspietsch et al. | 192/70.25 |
| 2005/0133336 A1 | * | 6/2005 | AbuSamra et al. | 192/105 B |

FOREIGN PATENT DOCUMENTS

DE         30 19 377      11/1981

* cited by examiner

*Primary Examiner*—Saul Rodriguez
(74) *Attorney, Agent, or Firm*—Cohen, Pontani, Lieberman & Pavane

(57) ABSTRACT

A centrifugal clutch includes a housing which is rotatable about an axis, the housing having a plurality of first supporting areas which each extend radially with respect to the axis; a pressing plate which is axially movable with respect to the housing and is coupled to the housing for rotation about the axis; and a supporting element which is axially movable with respect to the housing, the supporting element having a plurality of second supporting areas which each extend radially with respect to the axis, each second support area being separated from a respective first support area by an axial distance which decreases with radial distance from the axis. A plurality of centrifugal members are supported between respective pairs of first and second support areas, each the centrifugal member being radially displaceable by centrifugal force along the respective pair of support areas to exert force in a clutch engaging direction along a force transmission path between the supporting element and the pressing plate. A wear compensation device is provided in the force transmission path between the supporting plate and the pressing plate.

15 Claims, 5 Drawing Sheets

CENTRIFUGAL CLUTCH

BACKGROUND OF THE INVENTION

1. Field of the Invention

The present invention is directed to a centrifugal clutch comprising a housing arrangement, a pressing plate which is coupled with the housing arrangement so as to rotate together with the latter around an axis of rotation and so as to be movable in the direction of the axis of rotation, a supporting element which is movable axially with respect to the housing arrangement, and a plurality of centrifugal members, each of which is supported with respect to the housing arrangement in a first supporting area extending radially from inside to outside and is supported with respect to the supporting element in a second supporting area extending radially from inside to outside. An axial distance between the first supporting area and the second supporting area of a pair of supporting areas associated with each centrifugal member decreases radially from inside to outside, and every centrifugal member is radially displaceable by centrifugal force along the pair of supporting areas associated with it.

2. Description of the Related Art

A friction clutch which can be activated by centrifugal force is known from DE 30 19 377 A1. By means of this known centrifugal clutch, a flywheel which is otherwise freely rotatable is suddenly coupled to a crankshaft of an internal combustion engine when a determined limiting speed of the flywheel is reached in order to generate a drive torque which cranks this crankshaft and accordingly starts the internal combustion engine. The roller elements acting as centrifugal members are supported with respect to a housing associated with the flywheel on the one hand and with respect to a plate-like supporting element on the other hand, these two structural component parts or structural component groups having supporting areas which approach one another in radial direction toward the outside. The plate-like supporting element which is not otherwise supported in the entire arrangement is supported in axial direction at a disk spring that is secured axially in its radial outer area with respect to the flywheel and, therefore, also with respect to the housing. This disk spring in turn acts upon the pressing plate in axial direction, namely, in the present case, by means of another disk spring. Accordingly, these two disk springs permanently generate a force which pretensions the supporting element in the releasing direction so that it is also ensured that the centrifugal members are positively pretensioned toward the radial inside and held in their radial innermost position when there is no centrifugal force applied.

SUMMARY OF THE INVENTION

It is the object of the present invention to provide a centrifugal clutch whose operating characteristic can remain substantially unchanged over the operating lifetime.

According to the invention, this object is met through a centrifugal clutch having a wear compensation device in the force transmission path between the supporting element and the pressing plate.

By providing a wear compensation device, it is ensured above all that the system components acting to generate the engagement force caused by centrifugal force can always act in the operating range for which they are designed. Accordingly, a change in the installation position of these components due to wear in any of the clutch components can be substantially prevented so that the clutch characteristic, particularly the speed/engagement force characteristic can be maintained constant over the operating lifetime.

For example, it can be provided that the wear compensation device has at least one readjusting element which is pretensioned in a readjusting direction and which has at least one ramp area.

In a particularly preferred construction variant which also generates large engaging forces, it can be provided that the supporting element acts upon the pressing plate by means of an actuation force transmission arrangement for implementing engagement processes and that the wear compensation device is provided in the supporting path between the pressing plate and the actuation force transmission arrangement. In this case, because of a very simple construction, it is advantageous when the pressing plate has a ramp area which complements the at least one ramp area of the at least one readjusting element, the at least one readjusting element moving along this ramp area when a readjusting process is carried out.

The at least one readjusting element can be a readjusting ring.

In order to make it possible for a wear compensation device of the type mentioned above to take effect when carrying out releasing processes in a reliable manner when wear has occurred previously, a lifting path limiting arrangement which limits the axial path of the pressing plate with respect to the housing arrangement when releasing processes are carried out can be provided. This can comprise, for example, a lifting path limiting member which is supported at the housing arrangement and which is displaceable relative to the latter when wear occurs. In order to be able to adapt this lifting path limiting arrangement to the wear that has occurred and so that always only the same axial lift for the pressing plate is permitted regardless of the instantaneous state of wear, it is further suggested that the lifting path limiting arrangement comprises a driving member which is supported at the pressing plate and which displaces the lifting path limiting member with respect to the housing arrangement when wear occurs.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
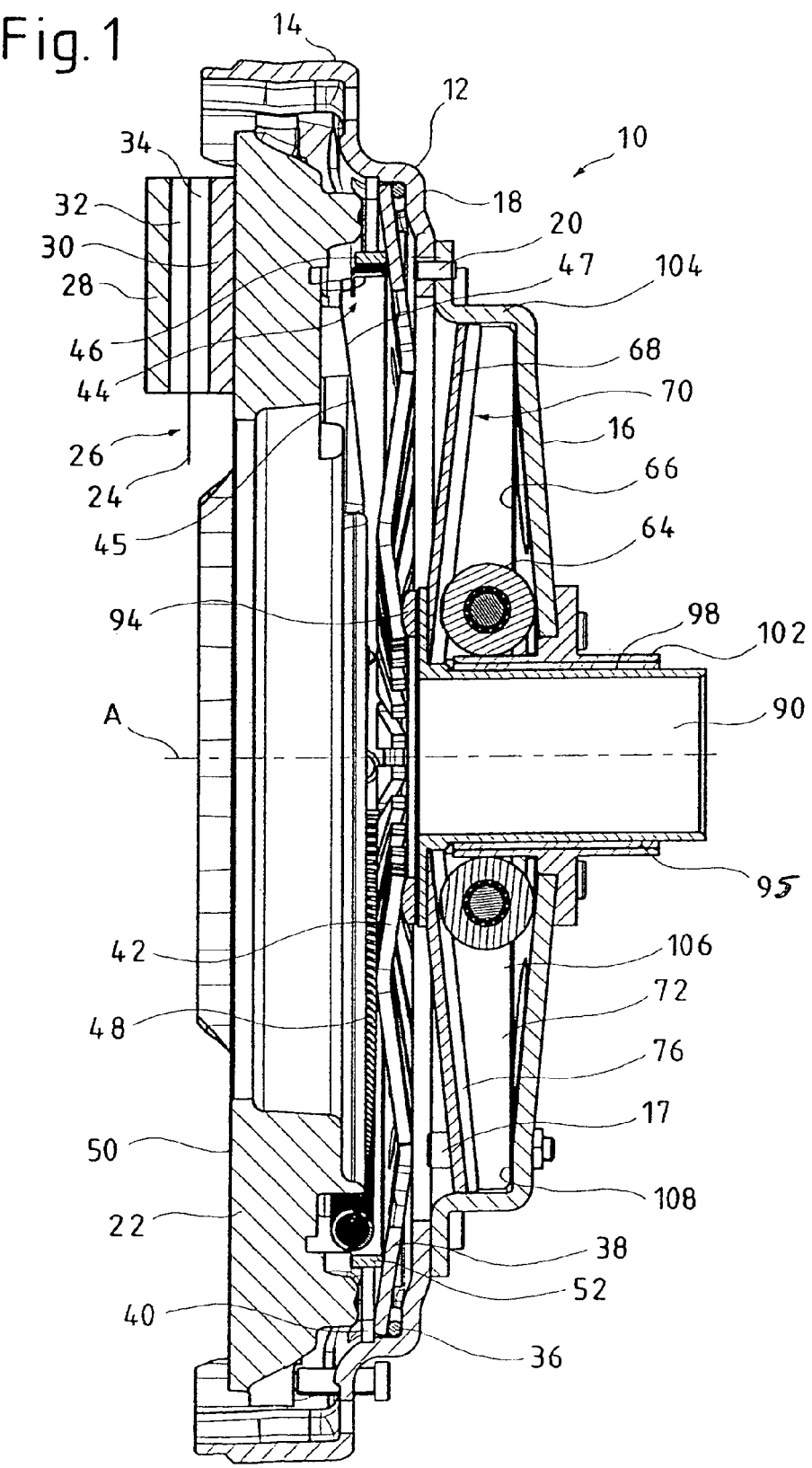
FIG. 1 is a view in longitudinal sectional through a pressure plate assembly for a friction clutch.

FIG. 1 shows a pressure plate assembly 10 for a centrifugal clutch, according to the invention, which can be used, for example, in connection with an automatic transmission. The pressure plate assembly 10 comprises a housing arrangement 12, which in turn has two housing parts 14, 16 which are fixedly connected or connectable to one another. The substantially cup-like, annular housing part 14 is designed in one axial end area, on the left-hand side in FIG. 1, to be fixedly connected to a flywheel. The housing part 16 substantially covers the central area that is left open by a base area 18 of the housing part 14. The two housing parts 14, 16 can be fixedly connected to one another by a plurality of screw bolts 20, rivet bolts, by welding or in some other manner.

An annular pressing plate 22 is received in the housing arrangement 12, particularly in the housing part 14. This pressing plate 22 is coupled by tangential leaf springs or the like, not shown, with the housing part 14 for common rotation around the axis of rotation A and for relative movement with respect to the housing arrangement 12 in direction of the axis of rotation. Further, these springs, not shown, generate a lifting force for the pressing plate which acts upon the pressing plate in the direction away from the flywheel and in the direction into the housing arrangement 12 or on the housing part 16 thereof. A clutch disk 24 which is indicated schematically only in the upper part of FIG. 1 lies between the flywheel, not shown, and the pressing plate 22. A hub area 26 of the clutch disk 24 can be connected to the transmission input shaft or the like on the radial inner side so as to be fixed with respect to rotation relative to the latter. Two friction linings 28, 30 are supported on the radial outer side of this hub area 26 by means of a lining spring arrangement 32, 34, respectively. Accordingly, in the engaged state of the friction clutch, these lining spring arrangements 32, 34 also generate a force which acts on the pressing plate 22 in the direction into the housing arrangement 12 and reinforces the action of the lifting springs, not shown.

An actuating force transmission element 38 which is constructed as a diaphragm spring is supported in axial direction at the base area 18 of the housing part 14 by a wire ring 36. A snap ring 40 or other securing member can be provided at the housing part 14 to support this actuating force transmission element 38 or diaphragm spring in the other axial direction. As will be described in the following, the force exerted by this diaphragm spring 38 is so designed that this force itself acts in the releasing direction, that is, the spring tongues 42 which are located on the radial inner side or which face the radial inner side generate a force in the direction away from the pressing plate 22.

On the radial inner side of the support with respect to the housing part 14, the diaphragm spring 38 is supported at the pressing plate 22 by a wear compensation device 44. This wear compensation device 44 comprises, for example, a compensating ring 46 which is supported, by means of wedge surfaces or ramp surfaces 45 extending in circumferential direction, at corresponding wedge surfaces or ramp surfaces 47 of the pressing plate 22 or possibly at a second compensating ring which is shaped in a complementary manner. A pretensioning spring 48 which is oriented substantially in circumferential direction is associated with the compensating ring 46, fastened to the compensating ring 46 on one side and to the pressing plate 22 on the other side and accordingly acts upon the compensating ring 46 for rotation in circumferential direction. If the compensating ring 46 were able to follow this action, the relative rotation between it and the pressing plate 22 would result in an increased axial distance between a friction surface 50 of the pressing plate and a support area 52 of the compensating ring 46 in which the latter is acted upon by the diaphragm spring 38. Accordingly, when relative rotation of the compensating ring 46 relative to the pressing plate 22 occurs or is made possible, wear occurring in the area of the friction linings 28, 30 or in other areas of the friction clutch or pressure plate assembly 10 can be compensated.

Figure 3:
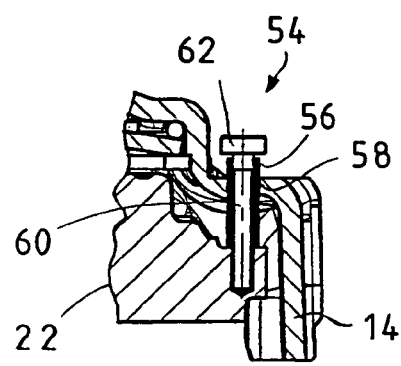
FIG. 3 is a detailed view of the pressure plate assembly shown in FIG. 1 with an axial movement stop for a pressing plate.
Figure 4:
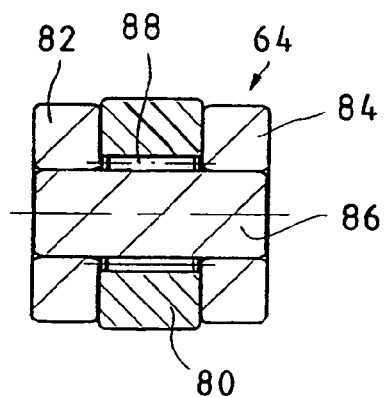
FIG. 4 is a sectional view through a roller element which is used in the pressure plate assembly of FIG. 1.
Figure 5:
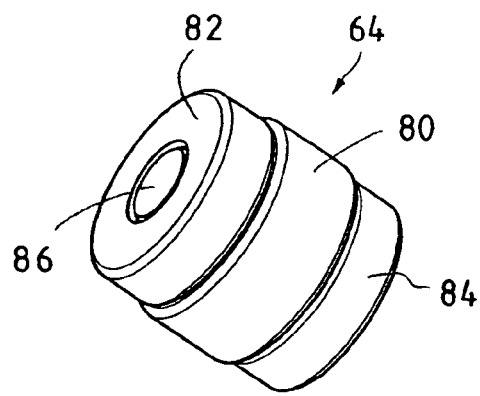
FIG. 5 is a perspective view of the roller element shown in FIG. 4.

The wear compensation device 44 further has at least one and preferably a plurality of axial movement limiting members 54 which can be seen in FIG. 3. Each of these axial movement limiting members 54 comprises a sleeve element 56 which is, in principle, movable in the housing part 14 in direction of the axis of rotation A but is held against this movement by means of frictional engagement or corresponding clamping. This sleeve element 56 is inserted in an associated opening 58 of the housing part 14 in such a way that a displacement thereof in axial direction can only occur through a corresponding expenditure of force. The sleeve element 56 is penetrated by a stop pin 60 which is fastened to the pressing plate 22 by one end area and which has, in its other end area, an expanded head area 62 which is located on the other axial side of the sleeve element 56 with respect to the position of the pressing plate 22. The portion of the pin 60 located between the pressing plate 22 and the head area 62 is dimensioned so as to be somewhat longer than the sleeve element 58. In this way, the pressing plate 22 can be displaced together with the pin 60 to a certain degree with respect to the sleeve element 58 and accordingly also with respect to the housing part 14. When the pressure plate assembly 10 is- new or has not yet been impaired by wear, the expanded head area 62 will contact the sleeve element 56 or is at only a very small distance from the latter when carrying out an engagement process or when in the engaged state, while the existing lifting clearance is then present at the other side between the pressing plate 22 and the sleeve element 56. When the clutch is changed to the disengaged state by a corresponding releasing of the diaphragm spring 38, the pressing plate 22 follows the releasing movement of the diaphragm spring 38 under the influence of the lifting springs, not shown, or lining spring arrangements 32, 34, so that the subassembly comprising the pressing plate 14 and compensating ring 46 is clamped in with respect to the diaphragm spring 38, and the compensating ring 46 can accordingly not yet rotate. It is only when the pressing plate 22 is prevented from further axial movement by abutting at the sleeve element 56 and when the diaphragm spring 38 is moved farther axially away from the pressing plate 22 that the compensating ring 46 can rotate, that is, far enough so that it compensates for the play occurring through further continuous movement of the diaphragm spring 38 in the direction away from the pressing plate 22. This occurs when the pressing plate 22 must be moved further in the direction of the flywheel beforehand in case of wear and the pin 60, with its expanded head area 62, has displaced the sleeve element 56 with respect to the housing part 14 to an extent corresponding to the existing wear. In a subsequent disengaging process with correctly adjusted clutch, the diaphragm spring 38 is moved axially farther than the pressing plate 22, which is prevented from this movement by the sleeve element 56, by exactly this extent of displacement of the sleeve element 46. In this way, the wear that was detected beforehand through the displacement of the sleeve element 56 can be compensated in an exact manner.

Of course, other wear compensation mechanisms known from the prior art can be used in the pressure plate assembly 10 according to the invention, although the construction described above is particularly suitable for this purpose due to its simple design.

The pressure plate assembly 10 according to the invention and the friction clutch having this pressure plate assembly are the type in which the pressing forces or the forces required for engagement are generated by centrifugal force, as will be described in detail in the following. For this purpose, the pressure plate assembly 10 has a plurality of roller elements 64 which are arranged in circumferential direction so as to be distributed around the axis of rotation A and act as centrifugal members. Each of these roller elements 64 is supported at a first supporting area 66 formed at the housing part 16 and at a second supporting area 70 formed at a plate-like supporting element 68 and can move radially outward along this associated pair of supporting areas 66, 70 with increased speed and a corresponding increase in centrifugal force. Accordingly, each supporting area 66, 70 constitutes a rolling track or guide path for the associated roller element 64. It can be seen that the axial distance between these respective supporting areas 66, 70 decreases radially from the inside to the outside. In this way, a relative angle of inclination is formed between the respective supporting areas 66, 70 associated with a roller element 64, which ensures that the plate-like supporting element 68 is displaced axially, namely, in the direction of the pressing plate 22, by a wedge action which occurs when the roller elements 64 are displaced radially outward. One or more pins 17 for preventing rotation is/are provided at the housing part 16 and penetrate the plate-like supporting element 68 in an associated opening and accordingly ensure that this plate-like supporting element 68 is only displaceable, but not rotatable, with respect to the housing part 16, and the supporting areas 66, 70 associated with a roller element 64 remain oriented exactly relative to one another in circumferential direction.

The construction of this plate-like supporting element 68 and roller elements 64 will be described in more detail in the following with reference to FIGS. 2 and 4 to 7.

Figure 2:
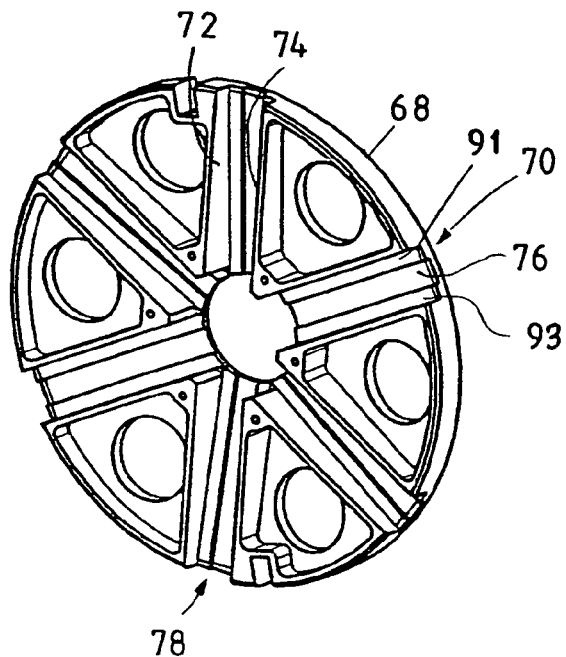
FIG. 2 is a perspective view of a supporting element.

First, FIG. 2 shows the plate-like supporting element 68 with its six second supporting areas 70 which are arranged in a star-shaped manner, that is, so as to extend substantially radially. Each of these supporting areas 70 is formed by a stepped recess 78 which is defined on two circumferential sides by a guide wall 72, 74 and has a continuing groove-like recess 76 in a base area.

Each roller element 64 has a central roller element 80 with a larger diameter and two lateral roller elements 82, 84 which are positioned on both sides of the central roller element 80, have a slightly smaller diameter than the central roller element 80 and are fixedly connected to one another by a shaft part 86. The shaft part 86 is rotatably supported by a roller body bearing, e.g., a needle bearing 88, at the central roller element 80, so that the central roller element 80 and the lateral roller elements 82, 84 are substantially freely rotatable with respect to one another. Rolling paths 91, 93 are formed respectively at both sides of the respective continuing recess 76 in the recesses 78 which essentially provide the second supporting areas 70, while the central roller element 80 does not have an axial supporting interaction with the supporting element 68 due to the depth of the recess 76. A circumferential guide for the roller elements 64 is provided by the walls 72, 74 which are so dimensioned that, although they decrease in height from inside to outside radially, the length by which they project over respective roller paths 91, 93 corresponds at least to the radius of the lateral roller elements 82, 84 and is preferably greater than this radius in all radial areas. An unwanted lateral or circumferential tilting of the roller elements 64 can accordingly be reliably prevented. The support with respect to the housing arrangement 12 or the first supporting areas 66 formed at the housing part 16 is carried out by means of the central roller element 80, as is shown in FIG. 1, which can roll along the inner surface of the housing part 16. Because of the rolling movement of the central roller element 80 at the housing part 16 on the one hand and of the lateral roller elements 82, 84 at the supporting element 68 on the other hand, which rolling movements are essentially independent of one another due to the uncoupling of rotation by means of the bearing 88, a radial displacement which is substantially free from the effects of friction in the area of interaction between the roller elements 64 and the supporting element 68 and the housing part 16 can take place when centrifugal forces occur.

Figure 6:
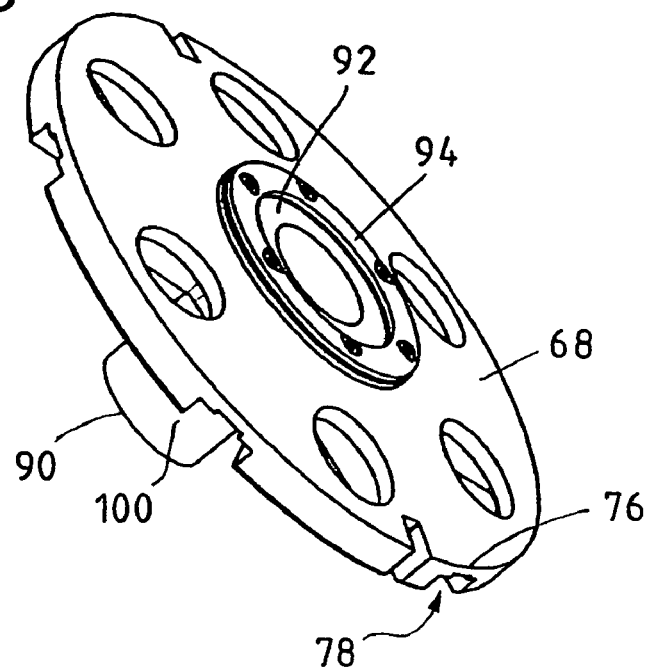
FIG. 6 is a perspective view of an assembly of the supporting element shown in FIG. 2 with a guide sleeve which is fixedly connected to the latter.
Figure 7:
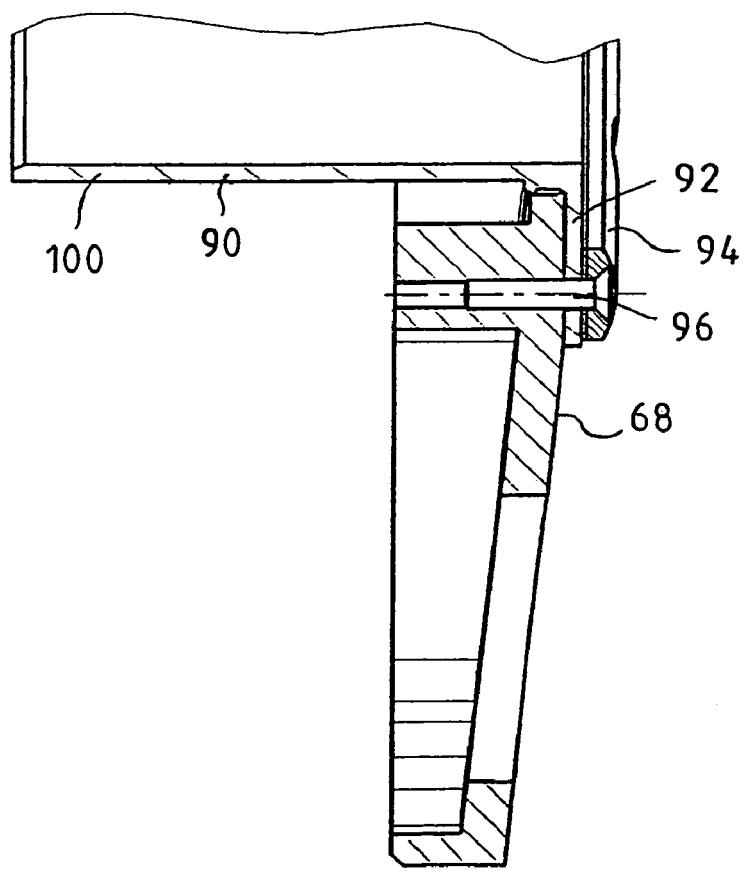
FIG. 7 shows a partial longitudinal section through the assembly shown in FIG. 6.

In order to ensure that all roller elements 64 are displaced radially to the same extent and are therefore subject to the same centrifugal force in the pressure plate assembly according to the invention in the rotational state, the supporting element 68 which is to be displaced axially under the influence of such centrifugal forces also carries out an exact axial displacement and does not tilt. Tilting of the support element 68 would cause one area of the supporting element to be at a greater distance from the housing part 16 than other areas of the support element, thereby allowing some of the roller elements 64 in the area in which the supporting element 68 and the housing part 16 are at a greater distance from one another to move radially outward farther than others of the roller elements 64. The radially further outward ones of the roller elements would therefore also be subjected to a still greater centrifugal force than the other roller elements, which would increase the tilting effect even more. In order to prevent this, the plate-like supporting element 68 is fastened to a guide sleeve 90 as is shown in FIGS. 6 and 7. This guide sleeve 90 has, in an end area, a flange area 92 extending outward radially to which the supporting element 68 is fastened together with a ring 94 by screw bolts 96 or the like. The spring tongues 42 of the diaphragm spring 38 which acts as an actuating force transmitting element is supported at this ring 94 in axial direction. The guide sleeve 90 is guided with the intermediary of a sleeve-like sliding bearing element 95 so as to be moveable axially at a support sleeve 98 which is fixedly connected to the housing part 16 by riveting or the like. The comparatively long axial extension of the sleeve portions 100 and 102 of the guide sleeve 90 and support sleeve 98 and a correspondingly precise fit in cooperation with the sliding bearing element 96 ensures that the guide sleeve 90 is guided substantially exactly for carrying out an axial displacement and substantially can not tilt with respect to the axis of rotation A. In a corresponding manner, the plate-like supporting element 68 can substantially only be axially displaced, so that the risk of tilting of this structural component part is essentially nonexistent because of the exact guidance. This provides the additional advantage that a correspondingly tight fit can also be provided in the radial outer area between the outer circumference of the plate-like supporting element 68 and a cylindrical portion 104 of the housing part 16 which encloses this radial outer area. In this way, with a corresponding closed construction of the supporting element 68, a substantially encapsulated volume area 106 can be produced in which the roller elements 64 can be displaced radially. On the one hand, this appreciably reduces the risk of impurities entering the area of the supporting areas 66, 70; on the other hand, it is possible to provide lubricant in this volume area which further reduces the friction forces occurring during the radial displacement of the roller elements 64. In order to achieve even better sealing in this respect, it is possible to insert between the radial outer area of the supporting element 68 and the cylindrical portion 104 of the housing part 16 a ring-shaped seal which, for example, is displaceable with the supporting element 68 and can slide along the housing part 16.

In the assembled state of the pressure plate assembly 10 shown in FIG. 1, the diaphragm spring 38 is held under pretensioning. This means that it contacts the ring 94 and accordingly ensures, due to the relative inclination of the two supporting areas 66, 70 associated with a respective roller element 64, that a force acting to pretension the roller elements 64 toward the radial inner side is generated so that these roller elements 64 contact the sleeve portion 102 of the support sleeve 98 on the radial inner side in the neutral or rest state. This provides a defined installation position for the diaphragm spring 38 in the released state in which centrifugal force are not active. This is important because it predetermines a defined basic position for the operation of the wear compensation device 44 and also for the position of the guide sleeve 56 at the housing part 14. In this released state, as was already mentioned, the action of the lifting spring arrangement ensures that the wear compensation device 44 is held in a definite manner between the pressing plate 22 and the diaphragm spring 38 so that an unwanted rotation of the compensating ring 46 can not occur.

When the system is set in rotation, the roller elements 68 are displaced radially outward under the action of centrifugal force. As a result, through the action upon the spring tongues 42 of the diaphragm spring 38, the latter acts upon the pressing plate 22 by way of the compensating ring 46 and the pressing plate 22 is accordingly displaced axially with respect to the housing part 14. On the one hand, the engaging force which is generated by the roller elements 64 in that they are acted upon by centrifugal force acts against the diaphragm spring 38 which is pretensioned in the releasing direction and, on the other hand, against the force that is produced through the lifting spring arrangement and likewise directed in the releasing direction. This additional force is appreciably smaller than the force generated by the diaphragm spring 38. When there is a sufficient displacement of the pressing plate 22, which entails a corresponding radial displacement of the roller elements 64, the friction surface 50 of the pressing plate 22 will come into contact with the friction lining 30 when the clutch slip point is reached, while the friction lining 28 will come into contact with the flywheel, not shown. When this state is reached, a coupling torque is transmitted between the pressing plate 22 and the flywheel, which is connected to the latter so as to be fixed with respect to rotation relative to it, and the clutch disk. As the engagement force continues to increase, this coupling torque will increase as a result of a continued radial displacement of the roller elements 64. When the engagement force increases in this way, the roller elements 64 must continue to work against the influence of force which is generated by the lining spring arrangements 32, 34 and which likewise acts upon the pressing plate 2 in the releasing direction. When a certain threshold rotational speed is reached, the roller elements 64 arrive in a radial outer area of the supporting areas 66, 70. In this radial outer area 108, supporting areas 66 have a smaller relative inclination with respect to supporting areas 70. As a result, the force which acts upon the roller elements 64 radial inwardly in principle due to the reaction forces described above and due to the wedge effect decreases spontaneously and the roller elements 64 are therefore suddenly moved radially outward until they reach their end position; for example, by abutting at the cylindrical portion 104 of the housing part 16.

Figure 8:
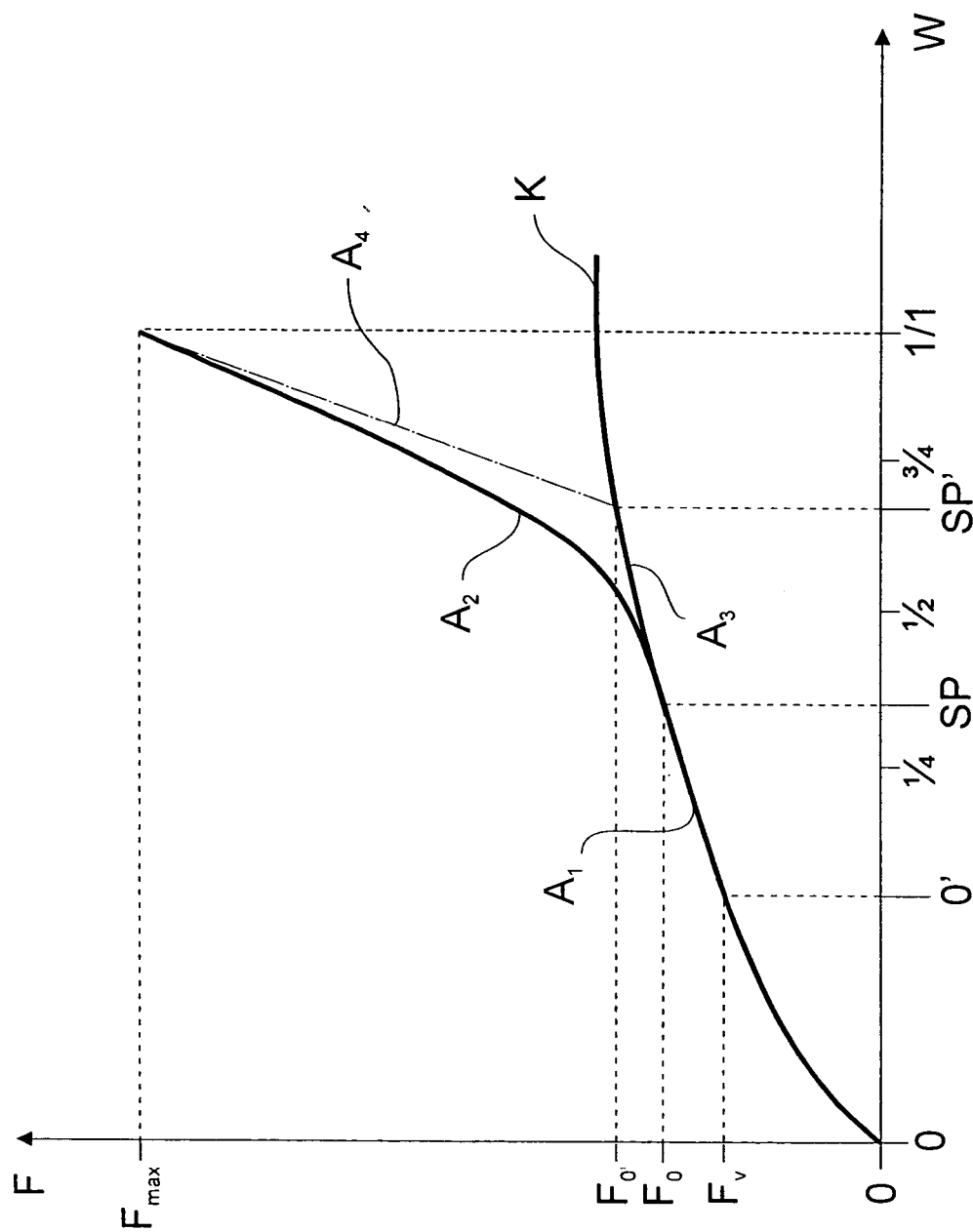
FIG. 8 is a force-path diagram which shows the engagement forces occurring in the pressure plate assembly in FIG. 1 as a function of the adjusting path or radial path of the roller elements.

The manner of operation of the pressure plate assembly according to the invention which has already been discussed above and the manner of operation of a friction clutch having this pressure plate assembly will be described in more detail in the following with reference to FIGS. 8 and 9. First, FIG. 8 shows a graph illustrating the forces which occur in the pressure plate assembly 10 and which are to be applied by the roller elements 64 for implementing an engagement process depending on the engagement path which corresponds to a corresponding radial path of the roller elements 64. This graph shows a force characteristic line K which illustrates the force characteristic of the diaphragm spring 38. Assuming an actuation path or deformation path of zero, which corresponds to a completely relaxed state of this spring, the reaction force F generated by this spring is likewise zero. As the actuation path increases, this force increases. It can be seen clearly that the gradient of the rise decreases as the adjusting path W increases in the clutch engagement direction until the maximum required or occurring adjusting path is reached but is not negative. This means that there is a constant rise of the reaction force of the diaphragm spring 38 over the entire active adjusting path; however, the extent of the rise per actuating path unit decreases as the fully engaged position is approached.

An adjusting path 0' is defined by the pretensioned installed position of the diaphragm spring 38 as was already described in the preceding; this adjusting path 0' corresponds to the fully released state of the pressure plate assembly 10 shown in FIG. 1. Accordingly, in this state the diaphragm spring 38 already generates reaction force $F_v$. This means that the action upon the roller elements 64 caused by centrifugal force at the start of rotation must initially be of such a magnitude that the axial application of force upon the supporting element 68 generated by these roller elements 64 must reach $F_v$, also taking into account the relative angle of inclination of the supporting areas 66, 70, before a radial displacement of the roller elements 64 and a corresponding axial displacement of the supporting element 68 can occur at all. When the rotational speed has become sufficiently high, the diaphragm spring 38 is increasingly tensioned through gradual displacement of the roller elements 64 radially outward, which corresponds to the force curve $A_1$ in FIG. 8 between actuation path 0' and actuation path SP that is reached when the roller elements 64 have covered somewhat more than one fourth of their maximum radial path. SP designates the slip point, that is, that state after which the clutch starts to transmit a torque through the frictional interaction described in the preceding.

In addition to the above-mentioned reaction force of the diaphragm spring 38 and the lifting force, the counterforce generated by the lining spring arrangements 32, 34 also becomes effective when the slip point SP is reached. As a result, the force curve to be applied by the roller elements 34 when acted upon by centrifugal force now follows a segment $A_2$ which rises with respect to the characteristic line K of the diaphragm spring 38. Accordingly, the reaction forces generated by the diaphragm spring 38 on one side and the lining spring arrangements 32, 34 on the other side are superimposed. It should be noted once again in this connection that the action of the lifting spring arrangement is not taken into account in this instance due to the comparatively small contribution of force. With continued application of centrifugal force and displacement of the roller elements 64 radially toward the outside, the force which is to be applied or which is provided by the latter increases and reaches a value $F_{max}$ at position 1/1 which is the radial outermost position of the roller elements 64. This is the force applied by the roller elements 64 in the fully engaged state of the clutch.

Further, the graph in FIG. 8 shows a curve $A_3$ between the actuation path or actuation position SP (slip point) and an imaginary slip point SP', as well as a curve $A_4$ between this imaginary slip point SP' and the fully engaged position, that is, the actuation path 1/1. These two segments $A_3$ and $A_4$ represent the reaction force curve in a hypothetical case in which, instead of the clutch disk 24 with friction linings and lining spring arrangement, there is only a clutch disk 24 with friction linings which are substantially rigid axially and also rigidly held and whose axial thickness is so dimensioned that it corresponds to the axial thickness of the clutch disk shown in FIG. 1 in the fully compressed state of the lining spring arrangements 32, 34. This means that in comparison to the relaxed state of the clutch disk 24 shown in FIG. 1, this imaginary clutch disk is thinner; as a result, the corresponding imaginary slip point SP' will also not occur until later on and to this extent the force to be applied in segment $A_3$ is initially moved farther along the characteristic line K of the diaphragm spring 38. When the imaginary slip point SP' is reached, a substantially linear and very steep rise in the reaction force and in the force to be applied by the roller elements 64 takes place along segment $A_4$. The cause of this steep rise substantially consists in that a deformation of the diaphragm spring 38 in its radial outer, substantially ring-shaped plate area or body area is no longer possible due to the blocking of the pressing plate 22 which then occurs preventing further axial movement, and the axial path which then occurs is caused substantially by a deformation in the area of the spring tongues 42, which then leads to the corresponding force characteristic.

It can be seen from the shape of the two segments $A_2$ and $A_4$ that the curve or segment $A_2$ also passes into this curve $A_4$ shortly before the radial outermost position 1/1 of the roller elements 64 is reached. This occurs when the lining spring arrangements 32, 34 are substantially fully compressed and, to this extent, a further displacement of the pressing plate 22 is likewise impossible during further possible radial displacement of the roller elements 64. A deformation will also occur substantially only in the area of the spring tongues 42 with the corresponding force characteristic.

It will be seen from the preceding description that the engagement force which is required and which is to be applied by the roller elements 64 is substantially defined by the two segments $A_1$ and $A_2$ between the fully released position corresponding to actuation path 0' and the fully engaged position corresponding to the radial outermost position 1/1 of the roller elements 64. This curve of the engagement force will result with a corresponding increase in rotational speed when the reaction forces on the one hand and the relative angle of inclination of the supporting areas 66, 70 and the mass of the roller elements 64 on the other hand are configured in a corresponding manner.

It can also be seen from the graph in FIG. 8 that at least force $F_v$ must be applied initially by the roller elements 64 in order to move the pressing plate 22 in the engagement direction at all and, further, at least force $F_0$ must be applied in order to bring the friction clutch or pressure plate assembly 10 into a state in which it begins to transmit torque. This means that a considerable part of the total force to be applied is not invested in the coupling torque per se, but is needed to move the clutch far enough for it to transmit a torque at all. However, this is also significant in that it can be ensured in this way that the clutch is adjusted in the engagement direction and in the torque transmitting direction only after a determined rotational speed and a correspondingly large centrifugal force. However, the characteristic line K with its gradient decreasing in the clutch engagement direction likewise ensures that, for example, after the actuation path SP, that is, after the slip point, a greater proportion of the force which then continues to be applied can be used for the actual generation of torque because of the smaller rise in the reaction force generated by the diaphragm spring 38.

Figure 9:
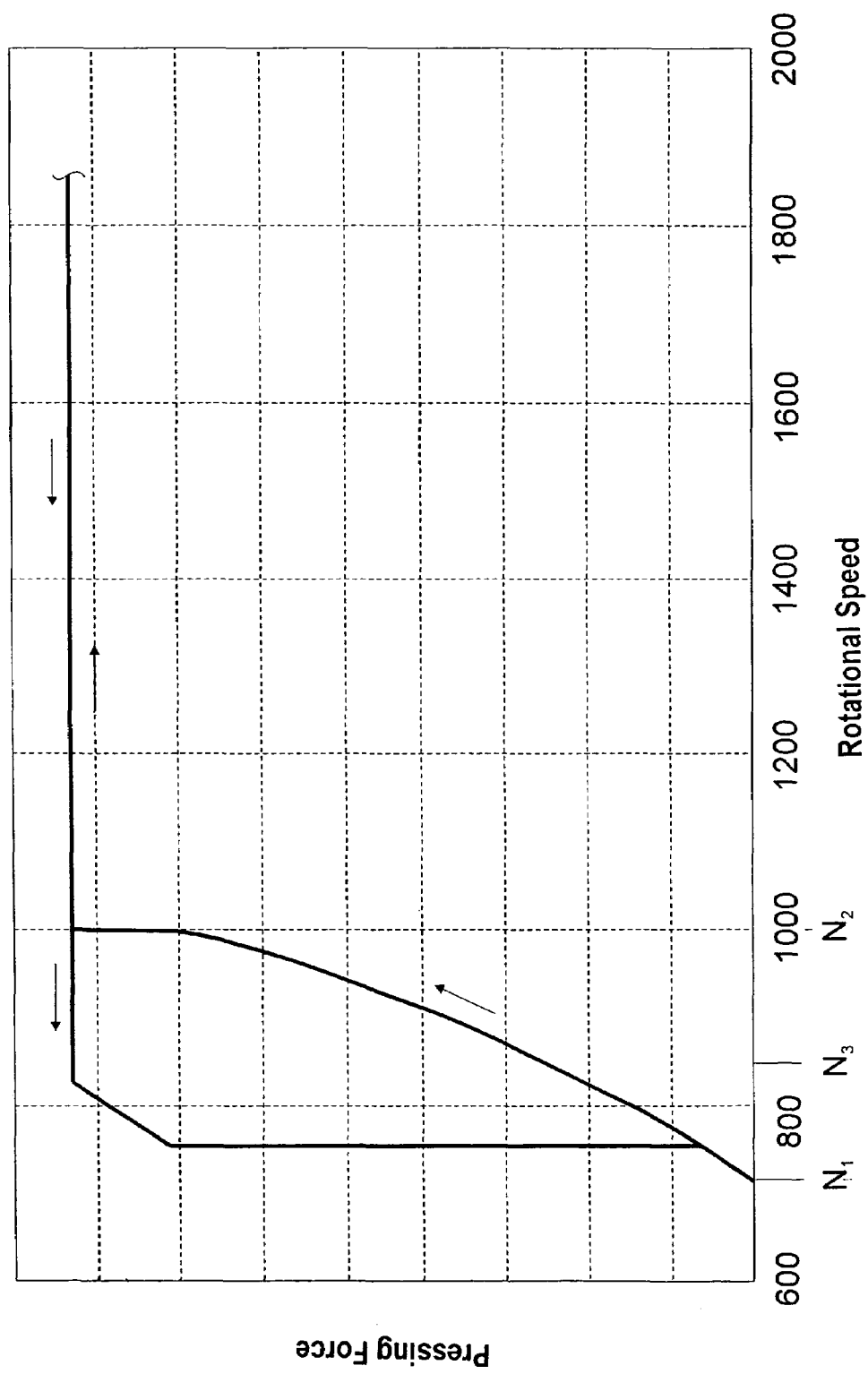
FIG. 9 is a rotational speed-pressing force diagram which shows the pressing forces occurring as a function of the rotational speed in the pressure plate assembly in FIG. 1.

FIG. 9 shows the curve of the pressing force depending on the rotational speed in the clutch described in the preceding. It will be seen that in this case initially the pressing force is actually zero up to a rotational speed of $N_1$, which means that the reaction forces mentioned in the preceding must first be overcome. The rise in the pressing force and engagement force starts after rotational speed $N_1$ which, as the rotational speed increases, corresponds to the movement of the roller elements 64 radially outward along the associated supporting areas 66, 70. At rotational speed $N_2$, the centrifugal force is of such a magnitude that the roller elements 64 achieve the transition to segment 108 of smaller relative inclination in the first supporting areas 66. When the, e.g., kink-shaped transition is exceeded, the force preventing the roller elements 64 from moving toward the radial outside decreases spontaneously. As a result, the roller elements then spontaneously move radially outward at rotational speed $N_2$ resulting in a correspondingly spontaneous rise in the pressing force. After this sudden displacement toward the radial outside, however, the roller elements 64 are prevented from further radial movement so that the supporting element 68 can also not be displaced farther axially and to this extent no change in the pressing force takes place as rotational speed increases. When the rotational speed decreases again, for example, from a rotational speed in excess of rotational speed $N_2$, there is still no displacement of the roller elements 64 toward the radial inner side initially when rotational speed $N_2$ is reached because, as a result of the appreciably smaller relative inclination of the supporting areas 66, 70 in this radial outer area, the reaction forces which are directed in the clutch releasing direction can not yet compel a corresponding radial displacement. It is only when rotational speed $N_3$ is reached, which is appreciably less than $N_2$ and, for example, can be somewhat greater than rotational speed $N_1$, that the centrifugal force has decreased enough so that the wedge effect in the area of the smaller relative inclination angle is now also great enough that the roller elements 64 roll radially inward in a compulsory manner. In the transition to the area of the greater relative inclination angle of the two supporting areas 66, 70, the wedge effect and the force component which is directed radially inward increase spontaneously in a corresponding manner so that the roller elements 64 again move radially inward substantially spontaneously or very quickly and the pressing force accordingly decreases correspondingly rapidly.

Of course, different variations can be provided in the above-described pressure plate assembly 10 and in a centrifugal clutch having the latter without diverging from the essential principle of the invention. For example, the supporting areas 66, 70 can, of course, be inclined in the same direction, but at different angles, while retaining the approach thereto radially outward with respect to the axis of rotation A. As was already indicated, the wear compensation device could also be constructed differently as long as the basic advantage and basic effective force characteristic is achieved, that is, as long as the diaphragm spring 38 and therefore also the plate-like supporting element 68, and along with the latter the roller elements 64, basically remain in the same operating position corresponding to the respective operating speeds also when wear occurs and occurring wear can not result, for example, in a shifting of the slip point due to decreasing thickness of the friction linings 28, 30.

Further, it is possible, of course, that the above-described aspect of preventing tilting of the plate-like supporting element 68 can also be realized when using an element of another kind to support the roller elements 64. In this case, it would be conceivable to support the roller elements 64 at the housing part 16 on one hand and at the pressing plate 22 on the other hand while omitting the supporting element 68, which means that the second supporting areas 70 would be provided at the pressing plate 22. In this case, the pressing plate 22 could be guided at the housing arrangement 12, for example, by the guide sleeve 90 in a correspondingly precise manner and without the possibility of tilting with respect to the axis of rotation. It should also be noted that the arrangement shown herein entails various basic advantages. For one, the radial path length for the roller elements 64 can be appreciably increased by introducing the supporting element 68, which involves the use of correspondingly smaller relative inclination angles and therefore also a clearly improved metering of the friction clutches depending on rotational speed. Further, the use of an actuation force transmitting element, e.g., the diaphragm spring 38, which acts in principle like a lever has the basic advantage that a transmission of force is generated which is approximately 1:6 in the present example. This means that a clutch of this type is also particularly suitable when comparatively large coupling torques are required. Further, as a result of this force multiplication, the spring tongues 32 must also be further axially displaced radially inward in order to force a determined axial lift of the pressing plate 22, which likewise contributes to an appreciably improved metering of a clutch system of the type described above.

Because of the manner of functioning described above and the pressing force and engagement force resulting in dependence on rotational speed and the force hysteresis when the rotational speed drops below $N_2$, it is ensured that the clutch remains fully engaged even when the rotational speed of the drive unit temporarily falls below this rotational speed $N_2$, e.g., when driving up hills, and it is accordingly ensured, especially in these high load states, that a correspondingly high driving torque or the full driving torque can be transmitted without slippage and without excessive loading of the clutch.

Further, by dividing the housing arrangement 12 into the two housing parts 14, 16, it is possible to provide a defined clutch engagement characteristic, particularly in the clutch area responsible for the centrifugal force function, through the selection of a housing part 16. In this case, for example, housing parts 16 with different inclinations of the supporting areas 66 with respect to the axis of rotation A and accordingly also with respect to the supporting areas 70 can be used in order to achieve a correspondingly adapted clutch engagement behavior in this manner.

The diaphragm spring 48 can be installed in such a way that the characteristic line K shown in FIG. 8 results in that a diaphragm spring having a substantially sinusoidal characteristic line in a manner known per se is so designed or is held under pretensioning in such a way that a correspondingly rising segment of the sinusoidal curve is used in the centrifugal clutch according to the invention. By preventing a falling characteristic curve of the diaphragm spring 38 with increasing actuation path in the engagement direction, the occurrence of unstable states or local energy minima in the radial adjusting path of the roller elements 64 is prevented.

Of course, each of the three aspects mentioned above, namely, the positive guidance for the supporting element and any element which is axially displaceable through the displacement of the rollers, providing wear compensation and the decreasing gradient of the diaphragm spring characteristic line is important in terms of its relevance to the invention by itself or in combination with any other of these aspects or other features described above.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A centrifugal clutch, comprising:
    a housing which is rotatable about an axis, said housing having a plurality of first supporting areas which each extend radially with respect to said axis;
    a pressing plate which is axially movable with respect to said housing and is coupled to said housing for rotation about said axis;
    an axially extending support sleeve fixedly connected to said housing;
    a guide sleeve axially guided in said support sleeve;
    a supporting element which is fastened to said guide sleeve and is axially movable with respect to said housing together with said guide sleeve, said supporting element having a plurality of second supporting areas which each extend radially with respect to said axis, each said second support area being separated from a respective said first support area by an axial distance which decreases with radial distance from said axis, wherein said support sleeve and said guide sleeve are arranged and dimensioned so that said guide sleeve is substantially only axially movable relative to said support sleeve, thereby substantially preventing tilting of said supporting element; and a plurality of centrifugal members supported between respective pairs of first and second support areas, each said centrifugal member being radially displaceable by centrifugal force along the respective pair of support areas to exert force along a force transmission path between said supporting element and said pressing plate a wear compensating device in said force transmission path between said supporting element and said pressing plate.

2. The centrifugal clutch of claim 1, wherein said wear compensation device comprises a readjusting element which is pretensioned in a readjusting direction, said readjusting element having at least one ramp area.

3. The centrifugal clutch of claim 1, further comprising an actuation force transmission arrangement in said force transmission path between said supporting element and said pressing plate, said wear compensation device supporting said actuation force transmission arrangement with respect to said pressing plate for engaging the clutch.

4. The centrifugal clutch of claim 2, wherein said pressing plate has at least one ramp area which complements a respective at least one ramp area of said readjusting element, each said ramp area of said pressing plate moving relative to a respective at least one ramp area of said readjusting element during readjustment.

5. The centrifugal clutch of claim 2, wherein said readjusting element is a readjusting ring which moves circumferentially during readjustment.

6. The centrifugal clutch of claim 1, further comprising a lifting path limiting arrangement which limits axial movement of said pressing plate with respect to said housing when the clutch is released.

7. The centrifugal clutch of claim 6, wherein said lifting path limiting arrangement comprises a lifting path member which is supported at said housing and which is displaceable relative to said housing when wear occurs.

8. The centrifugal clutch of claim 7, wherein said lifting path limiting arrangement further comprises a driving member which is supported at said pressing plate and which displaces said lifting path member with respect to said housing when wear occurs.

9. The centrifugal clutch of claim 7, wherein said lifting path member is a sleeve which is fitted in said housing, and said driving member is a stop pin which is received through said sleeve, said stop pin having one end fixed in said pressing plate and an opposite end with a head which abuts said sleeve when wear occurs, thereby displacing said sleeve with respect to said housing.

10. The centrifugal clutch of claim 1, wherein said supporting element has a plate-like shape.

11. The centrifugal clutch of claim 1, further comprising at least one pin fixed to said housing and penetrating said supporting element to prevent rotation of said supporting element relative to said housing.

12. The centrifugal clutch of claim 1, wherein said guide sleeve comprises at one end a radially extending flange area to which said supporting element is fastened via screw bolts.

13. The centrifugal clutch of claim 1, wherein a circumferential radially outer end surface of said supporting element is tightly fitted to said housing, so that said supporting element, said support sleeve and said housing form an encapsulated volume area in which said centrifugal members are arranged.

14. The centrifugal clutch of claim 13, wherein said circumferential outer end surface of said supporting element is tightly fitted to said housing via a ring-shaped sealing element.

15. The centrifugal clutch of claim 14, wherein said ring-shaped sealing element is axially displaceable relative to said housing together with said supporting element.

* * * * *